(12) United States Patent
Watts

(10) Patent No.: US 7,418,986 B2
(45) Date of Patent: Sep. 2, 2008

(54) TREE STUMP GRINDER

(75) Inventor: Patrick Watts, Oxfordshire (GB)

(73) Assignee: Multi-Tip Designs Limited, Oxfordshire (GB)

( * ) Notice: Subject to any disclaimer, the term of this patent is extended or adjusted under 35 U.S.C. 154(b) by 0 days.

(21) Appl. No.: 10/588,348

(22) Filed: Aug. 3, 2006

(65) Prior Publication Data

US 2007/0125445 A1 Jun. 7, 2007

(30) Foreign Application Priority Data

Feb. 11, 2004 (EP) .................................. 04250748

(51) Int. Cl.
*A01G 23/06* (2006.01)
(52) U.S. Cl. .................... 144/24.12; 144/241
(58) Field of Classification Search ............. 144/24.12, 144/218, 230, 241; 241/294; 299/83.1, 101
See application file for complete search history.

(56) References Cited

U.S. PATENT DOCUMENTS

| | | | |
|---|---|---|---|
| 2,934,113 A * | 4/1960 | Hollien | 144/241 |
| 4,193,638 A * | 3/1980 | Heckenhauer | 299/101 |
| 4,530,385 A | 7/1985 | York | |
| 5,649,578 A * | 7/1997 | Leguin | 144/176 |
| 5,873,534 A | 2/1999 | Shinn | |
| 6,375,106 B1 | 4/2002 | Sears | |
| 6,546,977 B1 | 4/2003 | Paumier | |
| 6,640,853 B1 * | 11/2003 | Sun | 144/218 |

FOREIGN PATENT DOCUMENTS

DE      296 02 918      4/1996

\* cited by examiner

*Primary Examiner*—Shelley Self
(74) *Attorney, Agent, or Firm*—Coats and Bennett PLLC

(57) ABSTRACT

A tooth (30) for use in a grinding wheel is provided. The tooth comprises a main body (31) including a slot (32) comprising two substantially planar surfaces for, in use, engaging with a slot (24) in the rotor (20), and at least one cutting face (33, 34, 35, 36) connected to and extending away from the main body. In use, the force in the plane of the rotor is transferred from the tooth onto the rotor via one of the planar surfaces provided on the slot.

19 Claims, 8 Drawing Sheets

TREE STUMP GRINDER

The present invention relates to tree stump grinding machines and particularly to the grinding wheel of such a machine and the associated tooth design.

It is known in the prior art to provide a tree stump grinding machine with a cutting wheel driven by a belt, a chain, shafts or hydraulic motors. Such machines are also referred to as cutting machines in some regions. Throughout the specification the term grinding machine will be used. Current stump grinding machines consist of a, typically circular, wheel with a number of receiving brackets positioned around the rim. The receiving brackets have channels into which are fitted individual cutting teeth. Each tooth is individually mounted and a gauge is often required to set each tooth at the correct distance from the centre of the wheel. Each tooth is held in place by retaining bolts that are tightened to a very high degree in order to hold the teeth. The bolts and retaining brackets are required to take the full rotational force of the grinding action. The wheel is provided with a plurality of teeth, some of which are fitted to cut vertically while others are fitted to cut horizontally, as the wheel moves along a horizontal and vertical axis. An example of such a grinding wheel is found in U.S. Pat. No. 6,484,766.

The teeth and receiving brackets provided on the grinding wheels known from the prior art have to be changed regularly as a result of the considerable wear that they encounter in use. Changing the teeth and receiving brackets is time consuming because of the set up accuracy required. Each tooth is generally held in place using two bolts to secure the receiving bracket and the tooth. The task of changing the teeth is invariably complicated by the earth and mud that clogs the teeth, brackets and bolt threads which then require cleaning prior to fitting of a new tooth. As a result of the earth and mud, the receiving thread in the cutting wheel and the bolt or bolts may become cross-threaded and require repair before a new tooth can be fitted. In addition to the expense incurred in a long down-time to change the teeth, the teeth and receiving brackets themselves are expensive because of the number of heavy duty components.

U.S. Pat. No. 6,550,504 shows an example of how a plurality of teeth can be attached to a rotor. Each tooth consists of a cutting tip and body portion. The body portion includes two holes that allow the tooth to be attached to the rotor and the rotor is provided with corresponding pairs of holes for attaching the teeth by suitable fixing means, typically bolts, that pass through the tooth and the rotor and is then secured, typically using a nut that screws onto the bolt. In this way the tooth is mounted on the rotor.

There are two forces acting on the tooth that are of importance in this context. The first is the sheer force that prevents the tooth from slipping around the rotor and that arises because the tooth is not in the plane of the rotor. The second force is the bending moment which is a function of the distance between the fixing means and the cutting tip. In the example shown in U.S. Pat. No. 6,550,504 the cutting tips are positioned considerably out of the plane of the rotor and therefore the bolt that attaches the tooth to the rotor will experience both the bending moment caused by the distance between the tip and the bolt and, in addition, the sheer force acting across the bolt.

U.S. Pat. No. 6,546,977 discloses a stump grinding device that reduces the force on the bolt by providing a cutting unit that is disposed in the plane of the rotor. Therefore the bending moment is considerably reduced in comparison with the example shown in U.S. Pat. No. 6,550,504. However, the sheer force across the bolt remains the means by which the force is transferred from the cutting tip to the rotor.

U.S. Pat. No. 6,375,106 discloses a machine that is designed to reduce waste by grinding. Although this is not the same technical field as the other art, some similar problems will be encountered. The teeth are replaceable and, unlike the previously discussed prior art, the attachment device is in the plane of the rotor. However, the tortuous cross section of the attachment device and locking element result in considerable stresses on certain parts of the interface between the rotor and the cutting tip.

According to the present invention there is provided a tooth for use on a grinding wheel, the tooth comprising a main body including a slot defining two opposed substantially planar surfaces for, in use, engaging with a slot in the rotor, at least one cutting face connected to and extending away from the main body;

whereby, in use, the force in the plane of the rotor is transferred onto the rotor via one of the planar surfaces provided of the slot.

The slot allows for the use of a single low cost bolt to keep the tooth in place. The tooth may be a multi-tipped tooth which may have protruding transverse tips to facilitate lateral grinding, in addition to radial tips. Such a multi-tipped tooth allows for cutting in radial and lateral directions simultaneously.

Preferably, the plurality of cutting tips includes at least two tips which are perpendicular to each other. The tooth may furthermore be provided with a through hole through which a fixing means may pass, in use and a channel in its back face.

The fixing means is typically a single low cost standard bolt with a locking nut and is a "throw away" item which can be changed every time a tooth is changed. This means that there is no cleaning required and therefore the problems with cross-threading encountered in the prior art are effectively overcome.

The transfer of the forces from the tooth to the rotor may be directly from the planar surfaces of the slot in the tooth on to the planar surfaces in the slot in the rotor. Alternatively, a keeper plate may be interposed between the slot in the tooth and the corresponding slot in the rotor. The keeper plate has the added advantage of being able to provide a means for screwing the bolt into the rotor and thereby tightening the tooth as it wears loose, in use. During the tightening process there is no relative movement between the keeper plate and the tooth. Instead, the keeper plate and tooth move together relative to the slot in the rotor. The underside of the tooth is provided with a tapered surface that interfaces with one of the planar surfaces that comprise the slot in the rotor. Therefore as the bolt is screwed into the rotor this causes relative movement between the tooth and the rotor thus tightening the tooth and preventing it from moving relative to the keeper plate. The taper is preferably the same on both surfaces and is generally around 11°.

Furthermore, in accordance with the present invention there is provided, a grinding unit for use with a grinding machine, the unit comprising:

a rotor having a rim around which a plurality of slots are provided;

a plurality of teeth, each tooth having a slot for engagement with one of the slots in the rotor; and fixing means for retaining each tooth in its associated slot in the rotor.

The provision of co-operating slots on the teeth and rotor rim obviate the need for precise set-up required by the grinding units of the prior art. Furthermore, the fixing means is required only to retain the tooth in place as the wheel itself absorbs a substantial proportion of the forces in the plane of the rotor resulting from the grinding action.

The radius of the rotor may vary around the circumference. In particular the shape of the rotor may be that of a polygon that may be irregular. Preferably the rotor has an even number of sides and preferably there is a slot provided at each corner of the polygon.

The polygonal shape of the rotor allows the teeth to be positioned at different distances from the axis of rotation of the rotor. A rotor with an even number of sides is preferable as it facilitates easy balancing of the wheel. If the slots were not provided at the corners of the polygon, there would be sections of the polygon extending further than the teeth and these would, in use, impact on the stump to be ground, causing damage to the grinding unit.

When the term "slot" is used in this specification it is intended to refer to any physical configuration that provides two planar surfaces that enable the interlocking of a second piece. In particular a simple slot may be provided in the circumference of the rotor by cutting a substantially U-shaped gap in the periphery of the rotor thus providing two substantially planar surfaces into which a tooth may be slotted in use. Alternatively, the slot may be formed by the provision of matching pairs of protrusions on the sides of the rotors that have the combined effect of providing a slot on the side of the rotor. These protrusions may be welded on or may be cast as part of the rotor itself.

Preferably the slots are arranged in diametrically opposed pairs wherein the slots in an opposing pair of slots are the same distance from the axis. Preferably, the slots are arranged in two diametrically opposed series, each successive slot in each series having an increased distance from the axis.

The arrangement of the slots in diametrically opposed pairs equidistant from the axis of the rotor allows the rotor to be more easily balanced. Furthermore, this allows two series of teeth to be developed each covering 180/of the rotor. The teeth are located in the slots at the corners of the rotor and therefore, as a result of the differences in circumference of the rotor different teeth extend different distances from the axis of rotation of the rotor. As a result of the two diametrically opposed series, the stump is, in use, successively ground by teeth that extend further from the axis. If such a sequence of tooth diameters is used then it is clear that there is one correct direction of rotation for the rotor. The teeth that extend furthest from the axis do more of the cutting and those set further in towards the axis act as restrictors. This configuration of teeth also enables a sideways or slew cut to be achieved.

The number of slots is preferably 4, 6, 8, 10 or 12. Some or all of the slots may be angled either towards or away from the axis of rotation of the rotor. If the slots are angled towards the axis of rotation, the teeth will protrude perpendicular to the rim of the rotor and therefore, dependent on the configuration of the cutting tips of the teeth, the rotor could be rotated in either direction. However, if the slots are angled away from the axis of rotation the teeth will protrude at an angle. In this case, the rotor will function correctly with only one direction of rotation. This is particularly useful in the case when the slots have been configured such that the tree stump is ground with teeth that protrude progressively further from the axis of rotation over a range of 180°.

The present invention will now be further described with reference to the accompanying drawings in which.

Figure 1:
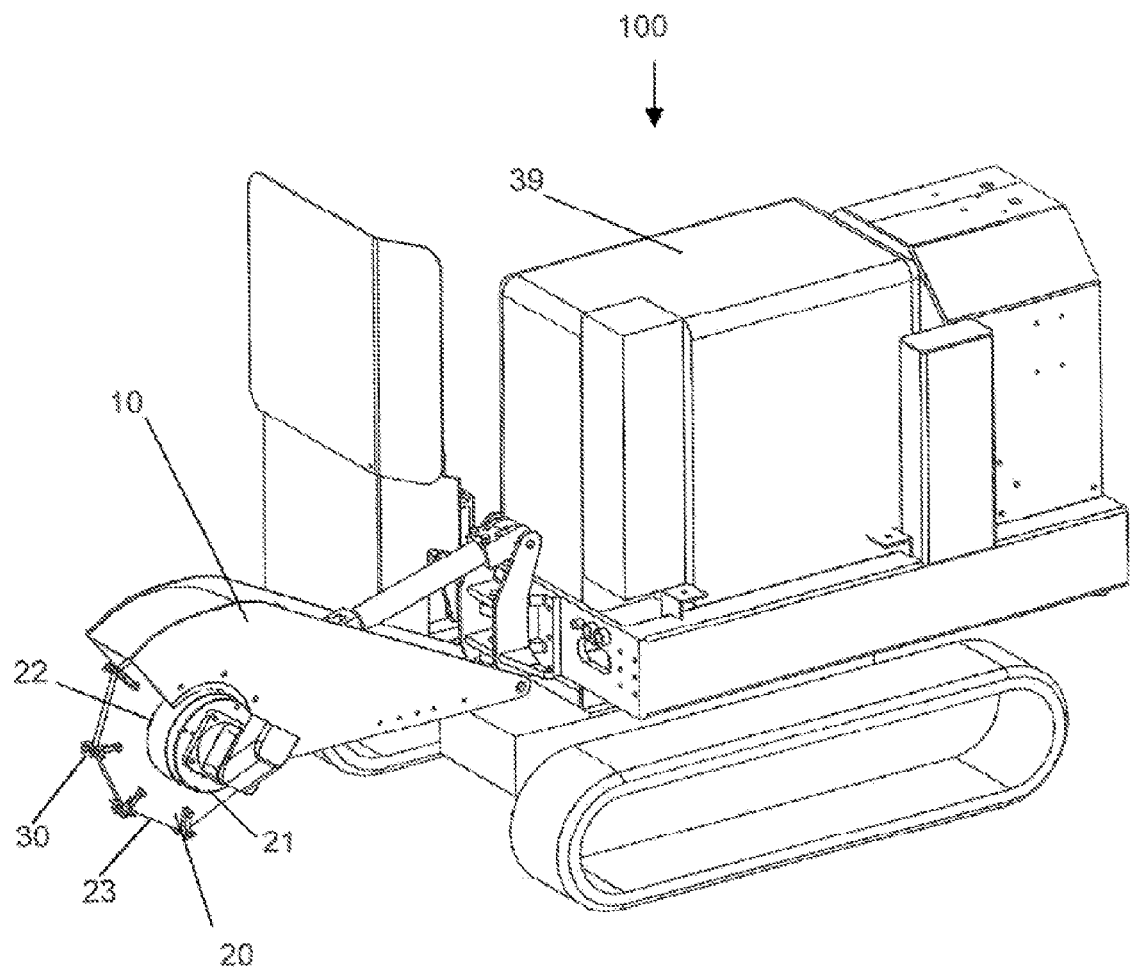
FIG. 1 shows a tree stump grinding machine incorporating a grinding unit according to the present invention and a plurality of teeth according to the present invention.
Figure 2A:
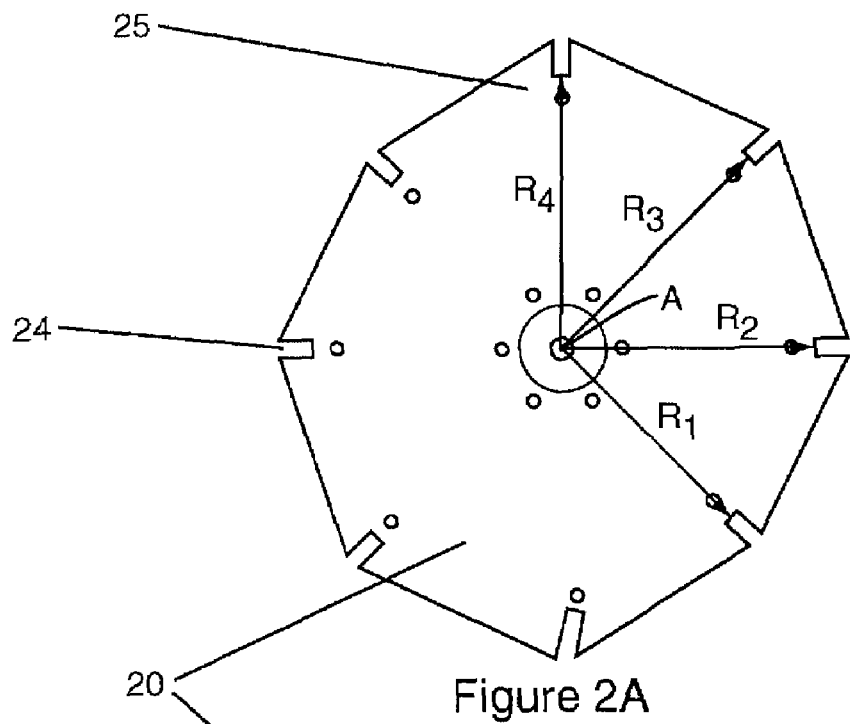
FIG. 2A shows a cross-section of a rotor and FIG. 2B shows the rotor fitted with a number of teeth.
Figure 2B:
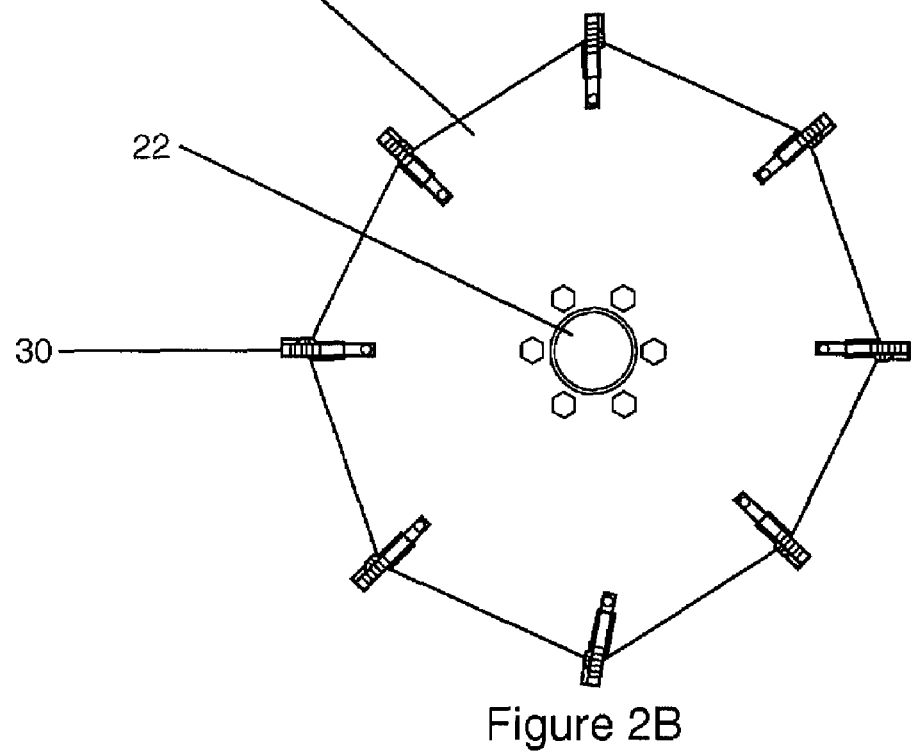

FIG. 1 shows a grinding machine 100 comprising a support arm 10, a rotor 20 and a plurality of teeth 30. The arm 10 forms a housing for a transmission which may be a belt, chain drive shaft or hydraulic motor. The rotor 20 is caused to rotate by a driving engine 39 that transmits the power via the transmission housed in the support arm 10. The rotor 20 is attached a central hub 22 which passes through a set of bearings contained within a bearing housing 21 which is attached to the arm 10. As shown in FIGS. 2A and 2B, around the rim 23 of the rotor 20 are a plurality of slots 24 located on the corners of the rim. Radially inwardly of each of which there is provided a respective hole 25. The rotor 20 is octagonal, although almost any polygonal shape may be used, in particular a hexagon or decahedron. Each of the slots 24 and respective holes 25 is used to accommodate a tooth 30. A fixing bolt passes through the tooth 30 and through the hole 25 in the rotor 20 in order to secure the tooth 30 in position on the rim 23 of the rotor 20.

FIG. 2A shows a cross section of the rotor 20 and FIG. 2B shows the rotor 20 fitted with teeth 30. Eight teeth 30 are provided, one at each corner of the rotor 20. The irregular shape of the rotor results in the radius thereof varying along the rotor's circumference and in the teeth 30 not being equidistant from the hub 22 of the rotor 20. The varying radii are indicated in FIG. 2A by the differing radii $R_1, R_2, R_3, R_4$. The teeth are arranged in two series, each covering 180° of the rotor 20 wherein the distance of each tooth 30 from the rotor axis of rotation A is greater than the adjacent tooth in the direction in which the rotor rotates, in use. In use, the teeth 30 of the resulting rotor 20 grind a little more of the tree stump as each tooth 30 comes to make contact with the tree stump. This allows the grinding machine 100 to grind tree stumps more efficiently as a deeper side (slew) cut is achieved as the arm's cutting motion is sideways.

Figure 3A:
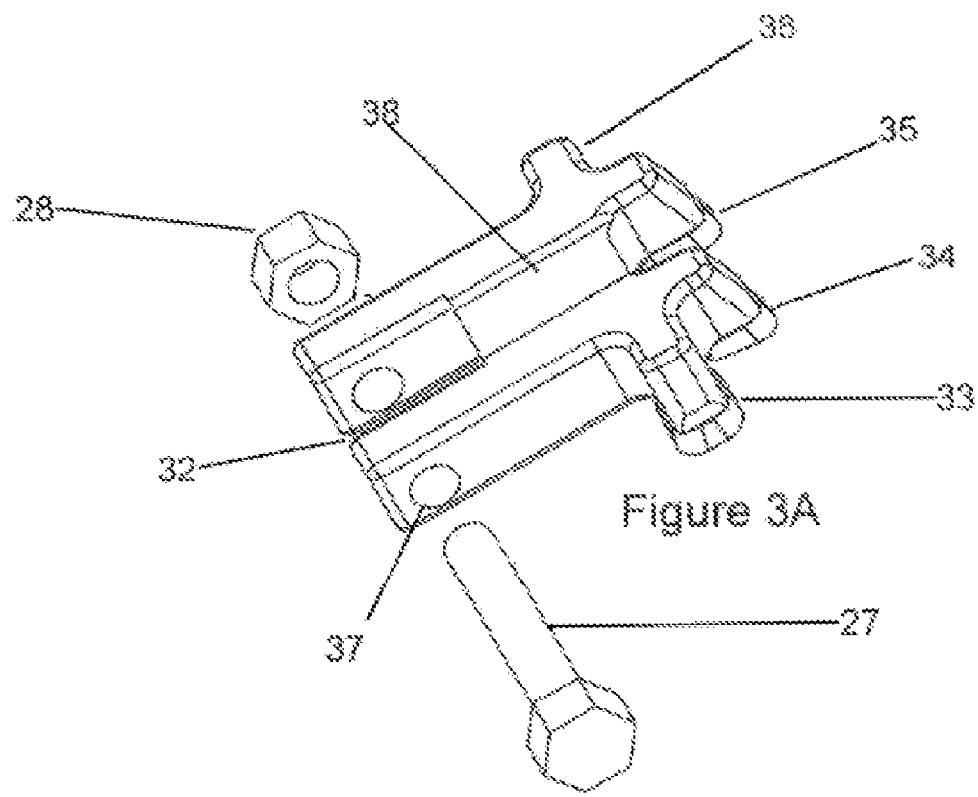
FIGS. 3A and 3B show perspective views of a single tooth.
Figure 3B:
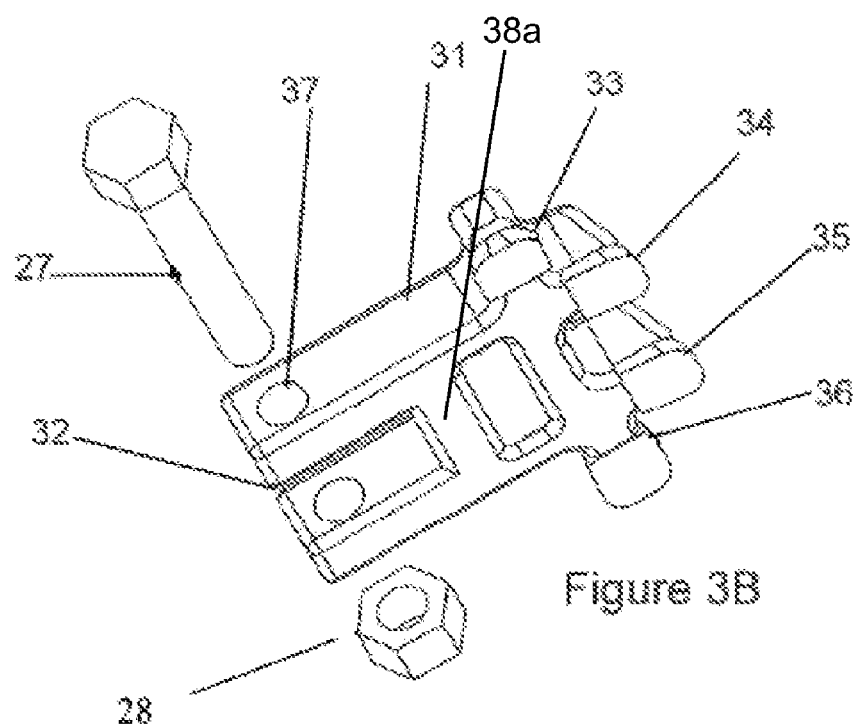

FIGS. 3A and 3B show a tooth 30 that has a body 31, a slot 32 and a plurality of cutting tips 33, 34, 35 and 36. The slot 32 has a hole 37 through which, in use, a bolt 27 passes to secure the tooth 30 onto the rotor 20. A nut 28 may be used to lock the bolt 27 in place. Alternatively, if the hole 37 in one side of the tooth is threaded it is not necessary to use a nut 28. The slots 24 on the rotor 20 interface with the slots 32 on the teeth 30 through the abutment of back and front planar surfaces 38, 38a of the tooth 30 with adjacent planar surfaces that form the slot 24 of the rotor 20. This interface allows a large proportion of the force in the plane of the rotor to be communicated directly onto the rotor 20 rather than communicating these forces through the fixing means. The bolt does not communicate the forces and is required to prevent the tooth from being discharged through centrifugal force alone. The four tips (33 to 36) are arranged in two orthogonal pairs allowing efficient cutting in radial and lateral directions simultaneously.

As shown in FIG. 3A the tooth 30 is also provided with a shallow channel 38 in the back face that forms the planar surface that allows the rotor 20 to take up forces from the tooth 30 in the lateral plane.

The through hole 37 may be provided on any part of the tooth 30 as the forces are communicated to the rotor 20 through the slots 24, 32 on the tooth 30 and the rotor 20 and the through hole 37 is not required for this function. The role of the through hole 37 in preventing the tooth from disengaging from the rotor 20 may be fulfilled regardless of the positioning of the through hole 37. Further protrusions or holes may be designed into the tooth to secure it into the rotor 20.

Figure 4A:
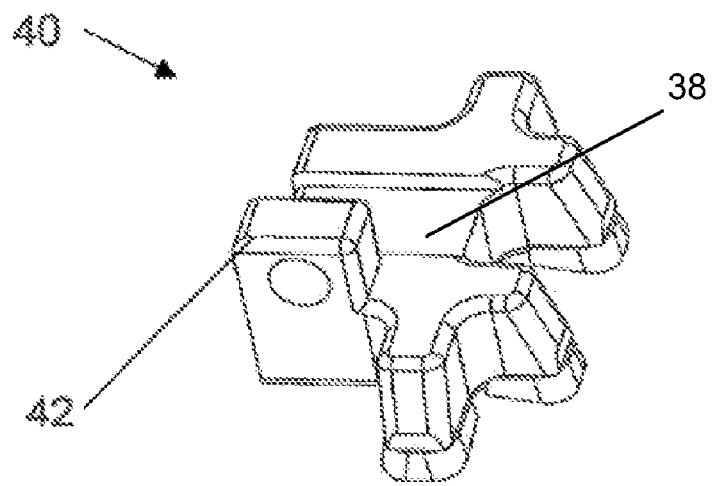
FIGS. 4A and 4B show perspective views of a further example of a single tooth.
Figure 4B:
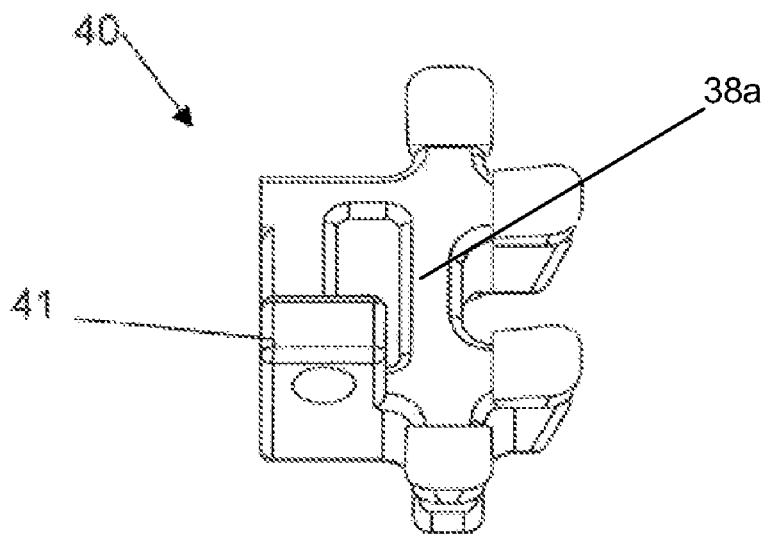

An alternative configuration of a tooth is shown in FIGS. 4A and 4B. This tooth 40 is provided with a pair of protrusions 41, 42 that extend radially along the rim. The tooth 40 interfaces with a slot 24 in a rotor 20 and the protrusions secure the tooth 40 to prevent it falling out. Although this configuration has less lateral stability than the tooth 30 shown in FIGS. 3A and 3B it is capable of communicating the forces to the rotor 20 as described above with reference to FIGS. 3A and 3B.

Figure 5:
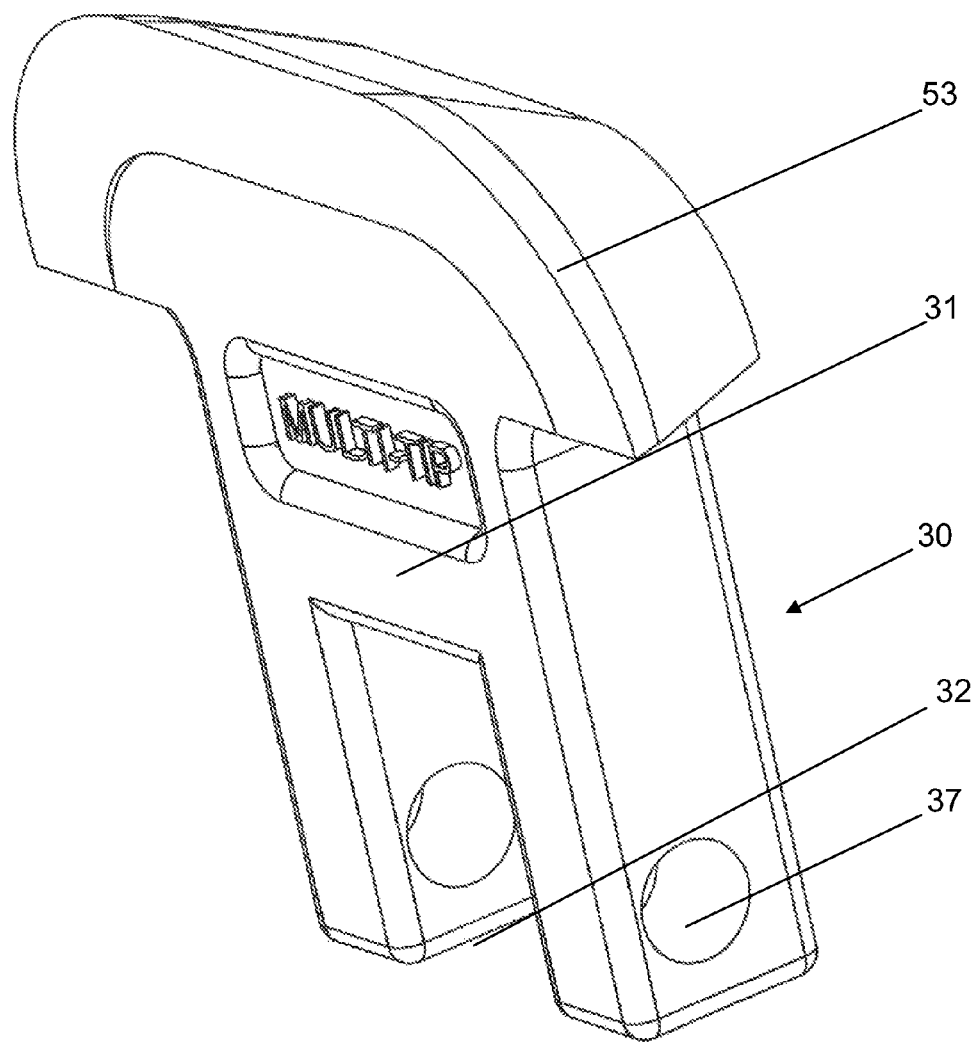
FIG. 5 shows a further example of a rotor with a slot.

FIG. 5 shows a further example of a tooth 30 according to the present invention. The tooth 30 comprises a body 31 provided with a slot 32 and hole 37 similar to those shown in FIGS. 3A and 3B. However, instead of a plurality of cutting tips 33 to 36 the tooth is provided with a single cutting face 53 which is "C" shaped which enables the cutting face 53 to cut in two perpendicular planes. The cutting face has a less tortuous cross section than the individual tips shown in FIG. 3 and therefore has a larger cutting surface for the same lateral extension from the rotor. As a result of this larger cutting surface, a larger volume of material can be removed at any one time.

Figure 6:
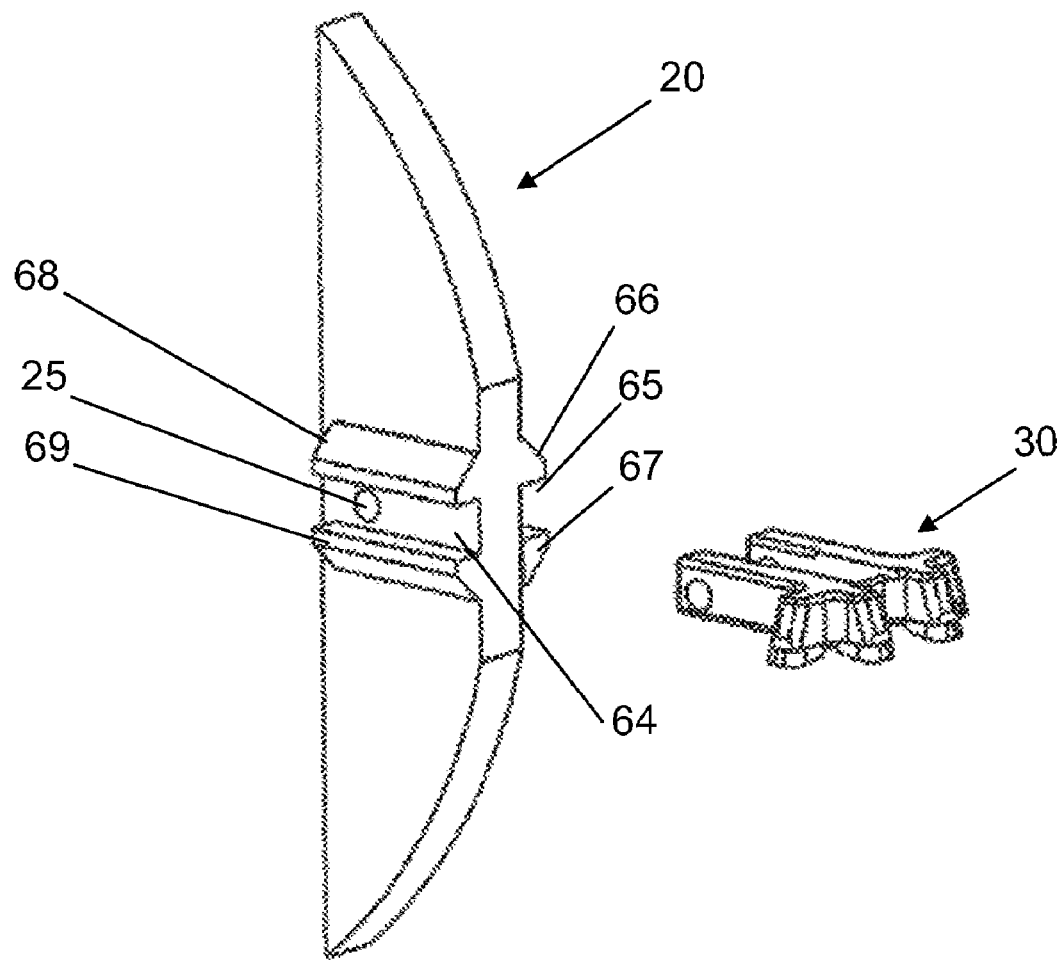
FIG. 6 shows a further example of a slot in the rotor.

FIG. 6 shows a further example of a slot in the rotor. The slots 64, 65 are provided as a matching pair of slots that are formed by protrusions 66, 67, 68, 69 that extend from the surface of the rotor 20. One pair of the protrusions 66, 67 are positioned on a first side of the rotor and the other two protrusions 68 and 69 are positioned on the opposite side of the rotor. Between them, each pair of protrusion form a narrow channel or slot. The protrusions 66 to 69 extend towards the centre of the rotor 20 and extend beyond the position of the hole 25 by which the tooth 30 is secured onto the rotor 20, in use. Pairs of slots 64, 65 may be added to the rotor 20 after it has been formed or may be formed integrally with the rotor.

Figure 7:
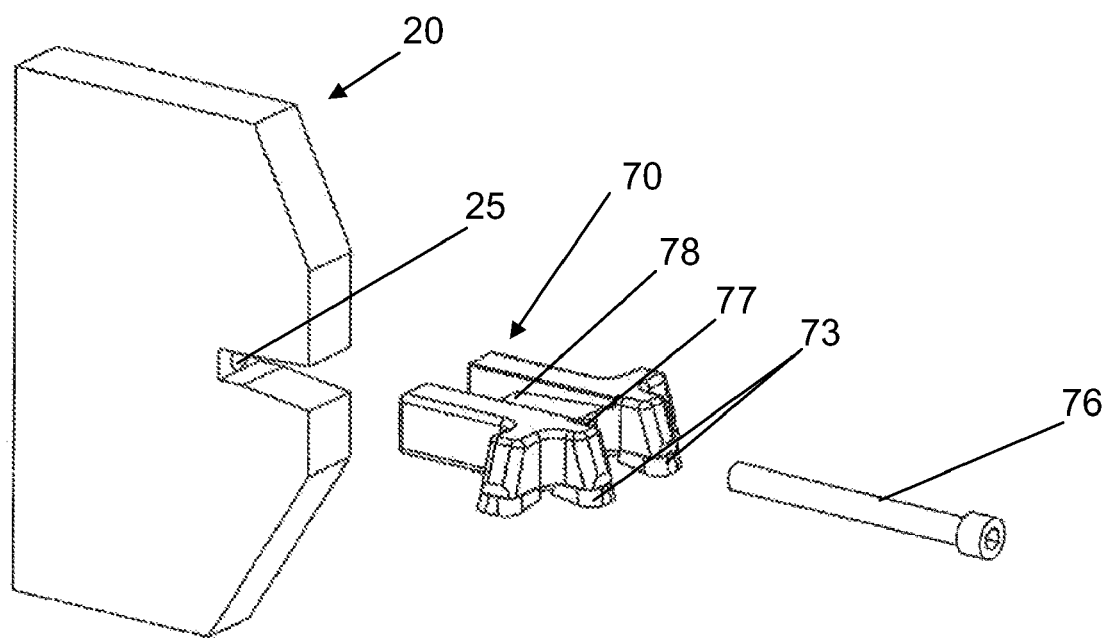
FIG. 7 shows a further example of a tooth and corresponding slot in the rotor.

FIG. 7 shows a tapered tooth 70 and a corresponding tapered slot 24 in the rotor 20. The tooth 70 functions in the same way as the tooth 30 shown in FIGS. 3 and 4 in that the forces exerted on the tooth 70 in the plane of the rotor 20 are transferred to the rotor 20 via one of the planar surfaces of the body of the tooth 70. However, instead of providing through holes 37 in the slot 32 of the tooth 30, there is provided a hole 77 through the body of the tooth 70 in the radial direction, as the tooth 70 rests in the slot 24 of the rotor 20. In order to prevent the tooth 70 from flying out of contact with the rotor 20 a bolt 76 is provided that passes through the hole 77 in the tooth 70 and into a corresponding hole 25 in the rotor 20. The body of the tooth 70 is tapered. The taper 78 provides a broader tooth cross-section closer to the cutting tips 73 of the tooth 70 and a narrower tooth cross-section closer to the centre of the rotor 20 when the tooth 30 is positioned for use on the rotor 20. The slot 24 in the rotor 20 is also provided with a taper that matches the taper 78 on the tooth 30.

Figures 8, 9:
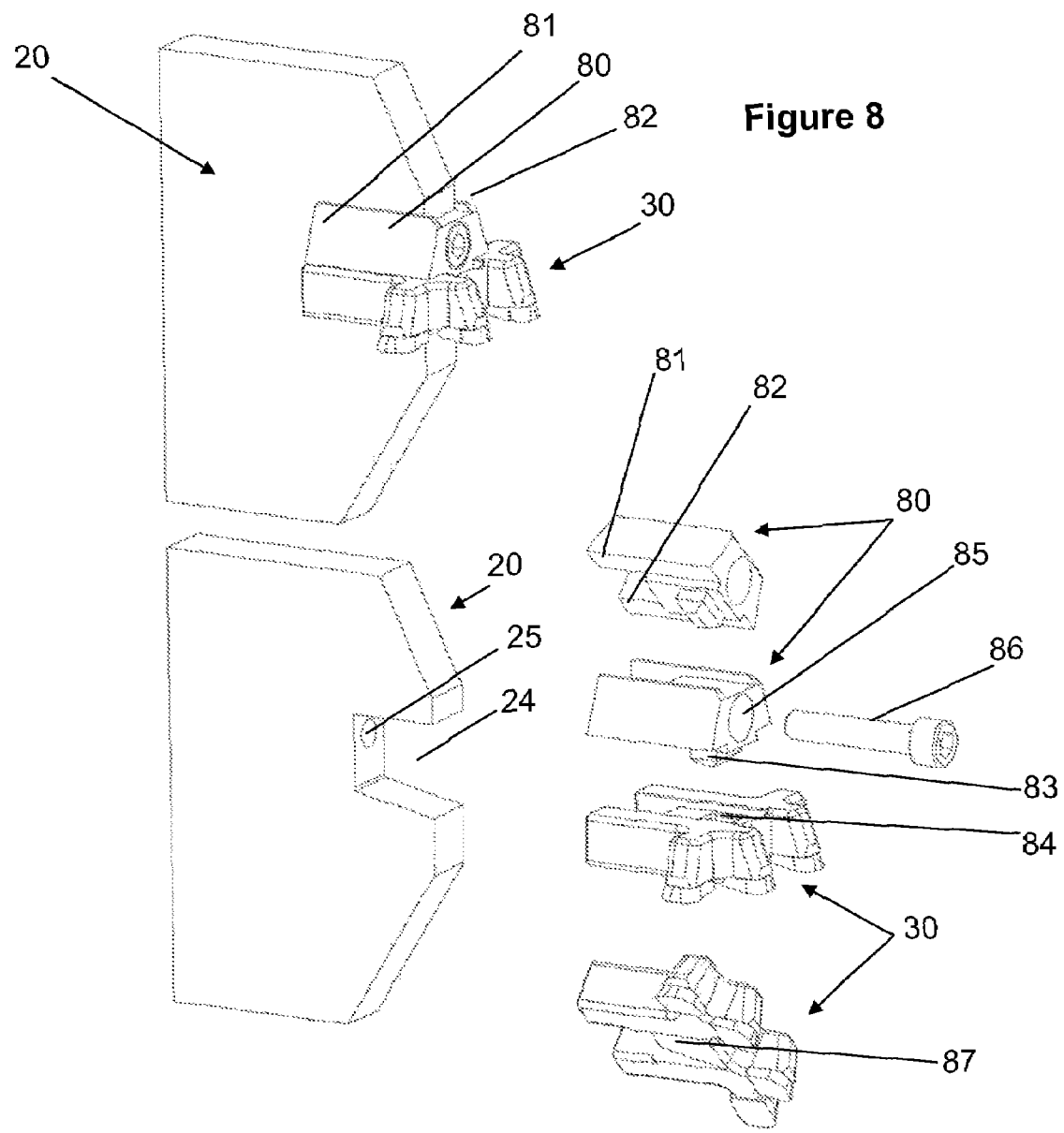
FIGS. 8 and 9 show a grinding wheel including a keeper plate.

FIGS. 8 and 9 show a grinding wheel including a keeper plate 80. The keeper plate 80 is shown in FIG. 8 in position between the tooth 30 and the rotor 20. The keeper plate 80 is suitable for higher power applications in which the forces on the tooth 30 are greater than in lower power applications. The keeper plate is a generally U-shaped member that abuts the tooth 30 and enables the tooth 30 to be tightened relative to the rotor 20. The keeper plate 80 has two leg portions 81, 82 which, in use, abut the sides of the rotor 20. The legs 81 of the keeper plate extend transversely beyond the edge of the slot 24 in the rotor 20. This prevents any movement in the plane perpendicular to the plane of the rotor 20. The keeper plate 80 is also provided with a lug 83 which interfaces with a notch 84 in the upper surface of the tooth 30, in use. The keeper plate 80 is also provided with a bore 85 and counter bore (not shown) arrangement that enables a bolt 86 to be screwed through the bore 85 in the keeper plate and into the hole 25 provided in the rotor 20.

The tooth is further provided with a tapered surface 87. The taper 87 is radial and provides a broader tooth cross-section closer to the tip of the tooth and a narrower tooth cross-section closer to the centre of the rotor when the tooth 30 is positioned for use on the rotor 20. The slot 24 in the rotor 20 is also provided with a taper that matches the taper 87 on the tooth 30.

When the tooth 30 is initially fitted into the rotor 20 the bolt 86 is screwed into the keeper plate so that the tooth 30 is held securely. After the tooth 30 has been used in the rotor 20 for some time the tooth 30 will work loose and begin to move slightly relative to the rotor 20. When this occurs the bolt 86 may be tightened so that the keeper plate 80 and tooth 30 move together radially inwardly toward the centre of the rotor 20. As a result of the tapered surface 87 on the lower part of the tooth and matching taper on the slot 24 in the rotor 20 the tooth 30 will be tighten into position on the rotor 20.

FIG. 9 shows the tooth 30 being replaced. It is not necessary to remove the bolt 86 entirely from the keeper plate 80 and therefore the keeper plate 80 remains attached to the rotor 20 throughout the replacement of the tooth 30. Instead, once the bolt 86 has been loosened there will be sufficient movement possible between the rotor 20 and the keeper plate 80 allow the tooth 30 to fall out of position and to be replaced by a new tooth.

The keeper plate 80 is made from a metal that is soft is comparison with the metal of the rotor 20 and tooth 30 and therefore the keeper plate 80 will wear more quickly than the rotor 20 and can be replaced more conveniently. The use of a keeper plate 80 thereby increases the useful life of the rotor 20.

The invention claimed is:

1. A tree stump grinding tooth adapted for use in a tree stump grinding wheel having a rotor, the tooth comprising:
   a main body comprising two substantially planar surfaces disposed so as to face in generally opposite directions;
   at least one cutting face connected to and extending away from the main body;
   wherein the cutting face includes at least two cutting tips which are oriented generally perpendicular to each other such that the cutting tips cut in orthogonal directions simultaneously when said tooth is rotated about an axis spaced from said tooth.

2. A tooth according to claim 1, wherein the main body comprises a back face comprising a channel therein.

3. A tooth according to claim 1, wherein said main body further comprises an alignment through hole.

4. A tree stump grinding unit adapted for use with a tree stump grinding machine, the unit comprising:
   a rotor having a rim around which a plurality of slots are provided;
   a plurality of teeth, each tooth disposed partially in a corresponding slot in said rotor and comprising:

a main body comprising two substantially planar surfaces disposed so as to face in generally opposite directions;

at least one cutting face connected to and extending away from the main body;

wherein a force applied to the tooth in the plane of the rotor is transferred from the tooth to the rotor via one of the planar surfaces; and wherein the cutting face includes at least two cutting tips which are perpendicular to each other; and fixing means for retaining each tooth in a corresponding slot in the rotor.

5. A grinding unit according to claim 4, wherein a radius of the rotor varies around a circumference thereof.

6. A tree stump grinding unit adapted for use with a tree stump grinding machine, the unit comprising:

a polygonal rotor having a rim around which a plurality of slots are provided; said slots extending generally radially inward relative to a rotational center of said rotor;

a plurality of teeth, each tooth comprising:

a main body comprising two substantially planar surfaces engaged with a respective slot in the rotor, at least one cutting face connected to and extending away from the main body;

wherein a force applied to the tooth in the plane of the rotor is transferred from the tooth to the rotor via one of the planar surfaces, with the force transfer oriented generally normal to that planar surface; and wherein the cutting face includes at least two tips which are perpendicular to each other; and fixing means for retaining each tooth in a corresponding slot in the rotor.

7. A grinding unit according to claim 6, wherein the polygon shape is irregular.

8. A grinding unit according to claim 6, wherein the rotor has an even number of sides.

9. A grinding unit according to claim 6, wherein each slot is provided at a corner of the polygon.

10. A grinding unit according to claim 8, wherein the slots are arranged in diametrically opposed pairs.

11. A grinding unit according to claim 10, wherein the slots in an opposing pair of slots are the same distance from the axis.

12. A grinding unit according to claim 8, wherein the number of slots is 4,6,8,10 or 12.

13. A grinding unit according to any one of claims 4 to 12, wherein at least one slot is angled towards the axis of rotation of the rotor.

14. A grinding unit according to any one of claims 4 to 12, wherein at least one slot is angled away from the axis of rotation of the rotor.

15. A grinding unit according to claim 12, wherein the slots are arranged in two diametrically opposed series, each successive slot in each series having an increased distance from the axis in the direction in which the rotor rotates, in use.

16. A grinding unit according to claim 4, wherein the rotor further comprises a plurality of through holes corresponding in number with the number of slots in the rotor, and each tooth further comprises a corresponding through hole in alignment with a respective through hole in the rotor when the tooth is located in the respective slot on the rotor, and wherein the fixing means is a nut and bolt, the bolt passing through the aligned through holes in the rotor and the respective tooth.

17. The tooth of claim 1 wherein said main body further comprises a slot disposed distally from said cutting face.

18. The tooth of claim 1 wherein said substantially planar surfaces are disposed generally parallel to said cutting face.

19. The tooth of claim 1 wherein said cutting face is disposed generally parallel to at least one of said substantially planar surfaces.

* * * * *